US012007925B1

(12) United States Patent
Xie et al.

(10) Patent No.: US 12,007,925 B1
(45) Date of Patent: Jun. 11, 2024

(54) SYSTEMS FOR SWITCHING INTERFACES TO MITIGATE INTERFERENCE

(71) Applicant: AMAZON TECHNOLOGIES, INC., Seattle, WA (US)

(72) Inventors: Yan Xie, Milpitas, CA (US); Aneesh Kachroo, Morgan Hill, CA (US); Chung Wai Benedict Ng, Menlo Park, CA (US); Arun Sundaram Subbanarayanan, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/935,375

(22) Filed: Sep. 26, 2022

(51) Int. Cl.
  *G06F 13/38* (2006.01)
  *G06F 13/42* (2006.01)
  *H04L 12/40* (2006.01)

(52) U.S. Cl.
  CPC ........ *G06F 13/385* (2013.01); *G06F 13/4282* (2013.01); *H04L 12/40* (2013.01)

(58) Field of Classification Search
  CPC ...................................................... H04L 12/40
  See application file for complete search history.

(56) References Cited

U.S. PATENT DOCUMENTS

| 2015/0134863 | A1* | 5/2015 | Hsieh | H04B 15/04 710/106 |
|---|---|---|---|---|
| 2016/0246752 | A1* | 8/2016 | Luo | H04W 72/0453 |
| 2016/0321206 | A1* | 11/2016 | Kim | G06F 13/4282 |
| 2020/0035082 | A1* | 1/2020 | Lee | G08B 5/22 |
| 2020/0226086 | A1* | 7/2020 | Kawai | G06F 13/4282 |
| 2021/0349844 | A1* | 11/2021 | Schaefer | G06F 13/4282 |
| 2022/0394610 | A1* | 12/2022 | Yao | G06F 1/3215 |

* cited by examiner

*Primary Examiner* — Henry Tsai
*Assistant Examiner* — Aurangzeb Hassan
(74) *Attorney, Agent, or Firm* — Lindauer Law, PLLC (57) ABSTRACT

A device includes a serial interface, such as Universal Serial Bus (USB) interface, having two operating modes. The first operating mode has a higher data transfer rate than the second operating mode, but also causes greater interference affecting use of a wireless network. To prevent loss of connectivity from the wireless network, when a detected signal strength associated with the wireless network is less than a threshold value, the interface is switched from the first operating mode to the second operating mode to reduce interference to use of the wireless network. During times when detected signal strength for the wireless network is high, the interface is switched to the first operating mode to allow for higher data transfer rates.

20 Claims, 6 Drawing Sheets

SYSTEMS FOR SWITCHING INTERFACES TO MITIGATE INTERFERENCE

BACKGROUND

Some types of interfaces used to transfer data, such as Universal Serial Bus (USB) or other serial interfaces, may cause interference (e.g., noise) that hinders use of other methods of data transfer, such as wireless networks. Interfaces having a higher data transfer rate may cause greater interference than interfaces having a lower data transfer rate. During times when a signal strength associated with a wireless network is weak, use of certain interfaces may hinder connectivity and use of the wireless network.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many types of devices use serial interfaces, which transmit data as a series of voltage pulses using one or more wires or other conductors, to efficiently exchange data between connected devices, or connected components within a single device. One example of a serial interface includes Universal Serial Bus (USB), which is associated with various cables, connectors, and communications protocols used to exchange data. Different versions of USB technology are capable of different data transfer rates. For example, USB 2.0 is typically capable of a data transfer rate of 480 megabits per second (Mbps), while USB 3.0 is typically capable of a data transfer rate of 4.8 gigabits per second (Gbps). USB 3.1 is typically capable of a data transfer rate of 10 Gbps. Most ports that are capable of communication using USB 3.0 or USB 3.1 ("USB 3.x") are backward-compatible, and a device using USB 2.0 will be able to connect to the port, but is limited to the slower data transfer rate associated with USB 2.0. Therefore, a port that is capable of communication using USB 3.x may operate using USB 3.x when connected to a device capable of also operating using USB 3.x, but may operate using USB 2.0 when connected to a device that is only capable of operating using USB 2.0.

Many types of devices, such as smart televisions, use serial interfaces, such as USB interfaces, to communicate between different device components, such as between a main circuit board and a Wi-Fi module that is used to exchange data with other devices using one or more wireless networks. For example, a Wi-Fi module associated with a smart television may include a wireless device that is used to receive audio and video data from a remote source for presentation using a display and speakers. The data throughput and connectivity associated with a wireless network may be affected by a variety of conditions, such as the placement of a device relative to an access point, router, or other components, the distance between the device and these components, the presence of physical obstacles between the device and these components, and so forth. For example, placement of a device a significant distance from an access point or router may cause the signal strength associated with the wireless network as perceived by the device, typically expressed as a Received Signal Strength Indicator (RSSI), to be low. Additionally, other devices in an environment with a device that uses a wireless network may cause interference (e.g., noise) when used, which may hinder the ability of the device to detect or use the wireless network, especially when the RSSI for the wireless network is low and the magnitude of the interference is greater than the signal strength associated with the wireless network.

In some cases, use of a serial interface, such as a USB interface, may cause interference to use of a wireless network. Typically, interfaces having a higher data transfer rate cause a greater amount of interference than interfaces having a lower data transfer rate. For example, when a USB 3.x interface is used, strong noise interference having a spectrum ranging from 0 to 20 gigahertz (GHz) may be observed. This interference may cause high desense for wireless networks, including but not limited to WIFI6E 2.4G, 5G, and 6G channels, which degrades the effective range of the wireless network and may hinder connectivity or use of the network by a device. For example, a smart television that uses a USB 3.x interface to communicate between components may generate interference that hinders or prevents the exchange of data by a Wi-Fi module associated with the smart television. Conventional efforts to mitigate the effect of interference caused by a serial interface having a high data transfer rate include use of shielding, grounding, tuning the position of an antenna, and so forth. However, these techniques have limited effectiveness, consume time and materials, and increase cost.

Described in this disclosure are techniques for automatically switching between different operating modes of an interface based on a determined signal strength of a wireless network. For example, a device may include an interface, such as a USB or other type of serial interface, or other types of interfaces (such as a parallel interface). The interface may have a first operating mode with a first data transfer rate and a second operating mode with a second data transfer rate that is less than the first data transfer rate. For example, a USB interface operating using USB 3.0 may have a data transfer rate of 5 Gbps, while a USB interface operating using USB 2.0 may have a data transfer rate of 480 Mbps. The device may also include a wireless interface or other type of wireless device that communicates using a wireless network. In some implementations, the wireless device may be connected to the serial interface. Different operating modes of the interface may cause different amounts of interference to use of the wireless network by the wireless device. For example, as described previously, when a USB 3.x interface is used, interference that may hinder connectivity or use of a wireless network by the wireless device may occur. When a USB 2.0 interface is used, a lower amount of interference may be present.

At times when the interface is idle (e.g., not currently in use transmitting or receiving data), periodically or on demand, a received signal strength value, such as an RSSI value, may be determined using the wireless device. The received signal strength value may represent the magnitude of the signal of a router, access point, or other device associated with the wireless network, as received by the wireless device. Based on the received signal strength value and the current operating mode of the interface, a determination may be made whether to: 1) retain the interface in the first operating mode; 2) transition the interface from the first operating mode to the second operating mode; 3) retain the interface in the second operating mode; or 4) transition the interface from the second operating mode to the first operating mode.

Specifically, correspondence between the received signal strength value and one or more threshold values may be determined. For example, if the received signal strength value is less than a first threshold value, this may indicate that the signal strength associated with the wireless network is low, and interference from the interface operating in the first operating mode may hinder connectivity or use of the wireless network. Therefore, the interface may be transitioned from the first operating mode to the second operating mode in response to the signal strength value being less than the first threshold value. Use of the interface in the second operating mode may cause less interference to use of the wireless network at times when the signal strength associated with the wireless network is low. Conversely, if the received signal strength value is greater than a second threshold value, this may indicate that the signal strength associated with the wireless network is high, and interference from the interface operating in the first operating mode is unlikely to significantly hinder connectivity or use of the wireless network. In such a case, the interface may be transitioned from the second operating mode to the first operating mode to enable use of the faster data transfer rate associated with the first operating mode, since the interference associated with the first operating mode is unlikely to interfere with use of the wireless network at times when the signal strength is high.

In some implementations, the first and second threshold values may be equal. However, in other implementations, the first and second threshold values may differ, such as to prevent unnecessary switches between operating modes when small variations in received signal strength values occur. In some implementations, the threshold value(s) may be determined by determining a first set of data throughput values associated with a range of signal values for the wireless interface or other wireless device, while the interface is operating in the first operating mode, and by determining a second set of data throughput value associated with the range of signal values when the interface is operating in the second operating mode. The determined data throughput values may be selected based on a Signal-to-Noise Ratio (SNR) being greater than a threshold value. For example, a maximum rate of data transfer that may be performed while maintaining an SNR that is greater than a threshold value may be used to determine a data throughput value. This process may enable, for each operating mode of the interface, a data throughput value for the device to be determined for a range of signal strengths associated with wireless networks. The threshold value(s) may be selected by determining a received signal strength value at which data throughput when using the second operating mode exceeds data throughput when using the first operating mode. In some implementations, multiple threshold values may be determined by selecting threshold values that are within a selected range of the determined signal strength value. For example, a difference between the determined signal strength value and each threshold value may be from 2 to 5 dB. Use of two threshold values that are separated by a selected value may prevent unnecessary switches between operating modes when small variations in received signal strength occur.

In some implementations, one or more other devices may be connected to the serial interface, or may utilize the wireless network. In such a case, received signal strength values from one or more other devices may be determined, and the interface may switch between operating modes based on correspondence between the received signal strength values and a threshold value. For example, a separate computing device in an environment with the device that includes the interface may communicate using the wireless network. In cases where a received signal strength value determined by the separate computing device is less than a threshold, interference associated with use of the first operating mode may hinder connectivity or use of the wireless network by the computing device. In such a case, the interface may be switched from the first operating mode to the second operating mode independent of the received signal strength value associated with a wireless device connected to the interface.

As a result of using the techniques described herein, a device may automatically utilize the higher data transfer rate associated with a first operating mode of an interface only at times when signal strength associated with a wireless network is high enough to avoid loss of connectivity due to the interference caused by the interface. The device may automatically utilize the second operating mode of the interface, which is associated with less interference, only at times when signal strength associated with the wireless network is low, to avoid loss of connectivity due to interference caused by the first operating mode of the interface.

Figure 1A:
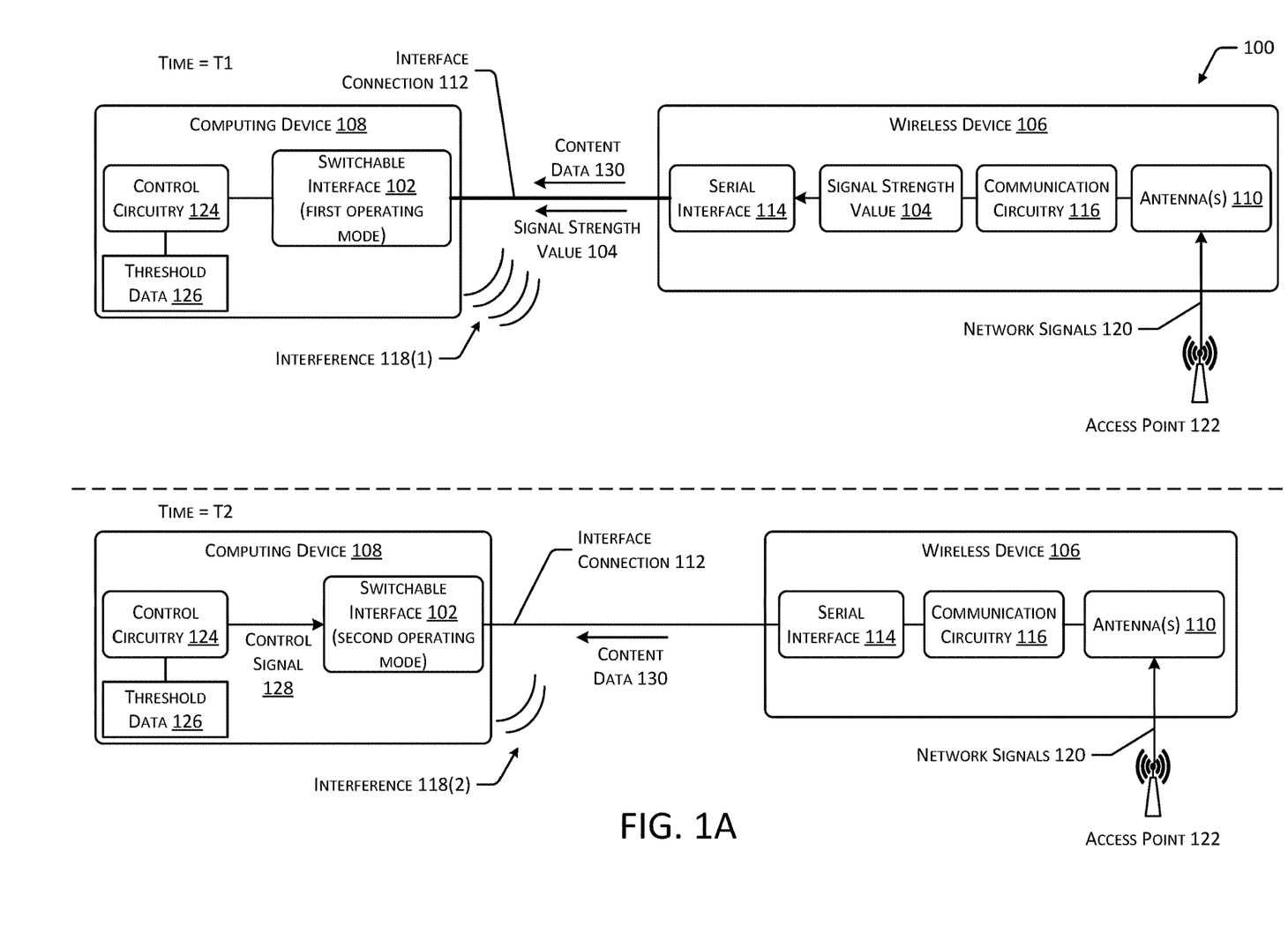
FIG. 1A is a diagram depicting an implementation of a system for changing operating modes of a switchable interface based on a received signal strength value associated with wireless communication using a wireless device.

FIG. 1A is a diagram 100 depicting an implementation of a system for changing operating modes of a switchable interface 102 based on a received signal strength value 104 associated with wireless communication using a wireless device 106. The system of FIG. 1A is shown including a computing device 108 that includes the switchable interface 102. The computing device 108 may include, without limitation, any type of personal computing device, portable computing device, wearable computing device, vehicle-based computing device, smart television, networked speaker device, media device, remote control device, game controller, and so forth. Additionally, while FIG. 1 depicts a single computing device 108, the computing device 108 may include any number of similar or dissimilar types of computing devices.

In one implementation, the computing device 108 may include a smart television or other type of media device configured to receive content data 130, which may include one or more of video data, audio data, image data, or other types of data, and present output based on the content data 130 using one or more displays, speakers, or other output devices. For example, a wireless device 106 may be connected to the switchable interface 102 via an interface connection 112. Continuing the example, the wireless device 106 may include a serial interface 114 that connects to the switchable interface 102 of the computing device 108, such as through use of one or more wired connections such as a USB cable, use of one or more circuitry pathways, or use of other conductors. The wireless device 106 may include communication circuitry 116 that receives content data 130 or other types of data using a wireless network. For example, the communication circuitry 116 may be connected to one or more antennas 110, which may receive network signals 120 associated with a wireless network via one or more wireless access points 122. The received content data 130 may be provided to the computing device 108 using the interface connection 112. For example, if the computing device 108 is a smart television or other type of media device, the content data 130 received by the wireless device 106 and provided to the computing device 108 using the interface connection 112 may include video data that is output using a display and speakers of the computing device 108. Other types of data may also be sent using the interface connection 112, such as various control or configuration instructions, telemetry, and so forth. A signal strength associated with the network signals 120, as received by the wireless device 106, may be affected by characteristics of the wireless device 106 or access point 122, placement of the wireless device 106 and access point 122 relative to one another, the presence or function of one or more objects in an environment with the wireless device 106 and access point 122, and so forth.

For example, use of the switchable interface 102 may cause interference 118(1) that affects use of the wireless network by the wireless device 106. For example, if the signal strength of the wireless network, as received by the wireless device 106, is less than the magnitude of the interference 118(1), connectivity, data throughput, error rates, and other parameters associated with use of the wireless network by the wireless device 106 may be affected. The switchable interface 102 may be configured to selectively communicate using at least two operating modes. As one example, the switchable interface 102 may communicate using a first operating mode in which the switchable interface 102 communicates using USB 3.x, and a second operating mode in which the switchable interface 102 uses USB 2.0. Continuing the example, the serial interface 114 associated with the wireless device 106 may be configured to communicate using USB 3.x. Because USB 3.x interfaces are backward compatible, when the switchable interface 102 operates in the first operating mode, the computing device 108 and wireless device 106 may exchange data using USB 3.x, while when the switchable interface 102 operates in the second operating mode, the computing device 108 and wireless device 106 may exchange data using USB 2.0. In other implementations, other types of interfaces, including non-serial interfaces, may be used.

As shown in FIG. 1A, at a first time T1, the switchable interface 102 may operate in the first operating mode, which may cause significant interference 118(1) to use of a wireless network by the wireless device 106. The wireless device 106 may receive network signals 120 associated with the wireless network from a wireless access point 122, and communication circuitry 116 may determine a received signal strength value 104, such as an RSSI value, that indicates the signal strength of the wireless network, as received by the wireless device 106. The wireless device 106 may provide data indicative of the signal strength value 104 to the computing device 108, in some implementations using the interface connection 112 between the serial interface 114 and the switchable interface 102.

Control circuitry 124 associated with the computing device 108 may determine correspondence between the received signal strength value 104 and threshold data 126. Threshold data 126 may include one or more signal strength values associated with operation of the switchable interface 102 in the first operating mode or second operating mode. For example, in response to a received signal strength value 104 below a first threshold value, the control circuitry 124 may transition the switchable interface 102 from the first operating mode to the second operating mode. Continuing the example, a received signal strength value 104 that is below the first threshold may indicate a low signal strength associated with a wireless network, as received by the wireless device 106. In such a case, significant interference 118(1) caused by operation of the switchable interface 102 in the first operating mode may hinder connectivity, data throughput, error rate, or other characteristics of use of the wireless network by the wireless device 106. Conversely, in response to a received signal strength value 104 greater than a second threshold value, the control circuitry 124 may transition the switchable interface 102 from the second operating mode to the first operating mode. For example, if the signal strength associated with the wireless network, as received by the wireless device 106, is high, it is unlikely that interference 118(1) associated with use of the switchable interface 102 in the first operating mode will significantly hinder use of the wireless network by the wireless device 106.

In the example shown in FIG. 1, at a second time T2, in response to the received signal strength value 104 and based on the threshold data 126, the control circuitry 124 may provide a control signal 128 to cause the switchable interface 102 to transition from the first operating mode to the second operating mode. Operation of the switchable interface 102 in the second operating mode may cause a smaller amount of interference 118(2) on use of the wireless network by the wireless device 106 compared to the operation of the switchable interface 102 in the first operating mode at the first time T1. As a result, the wireless device 106 and computing device 108 may continue to exchange data using the interface connection 112 using a slower data rate that causes less interference 118(2) to receipt of data by the wireless device 106 using the wireless network. Received signal strength values 104 may be determined from the wireless device 106 periodically, continuously, or on demand. For example, during times when the switchable interface 102 is idle (e.g., not transmitting or receiving data), a received signal strength value 104 may be determined from the wireless device 106 at a selected time interval, such as once every ten seconds.

While FIG. 1 depicts an implementation in which the switchable interface 102 is transitioned from the first operating mode to the second operating mode, in other implementations, other actions may be performed based on a relationship between the received signal strength value 104 and the threshold data 126, and based on the current operating mode of the switchable interface 102. For example, if the switchable interface 102 is using the first operating mode and the received signal strength value 104 is greater than a threshold value, the switchable interface 102 may continue operation in the first operating mode. If the switchable interface is using the second operating mode and the received signal strength value 104 is greater than a threshold value, the switchable interface 102 may be transitioned from the second operating mode to the first operating mode. If the switchable interface 102 is operating in the second operating mode and the received signal strength value 104 is less than a threshold value, the switchable interface 102 may continue operating in the second operating mode.

Figure 1B:
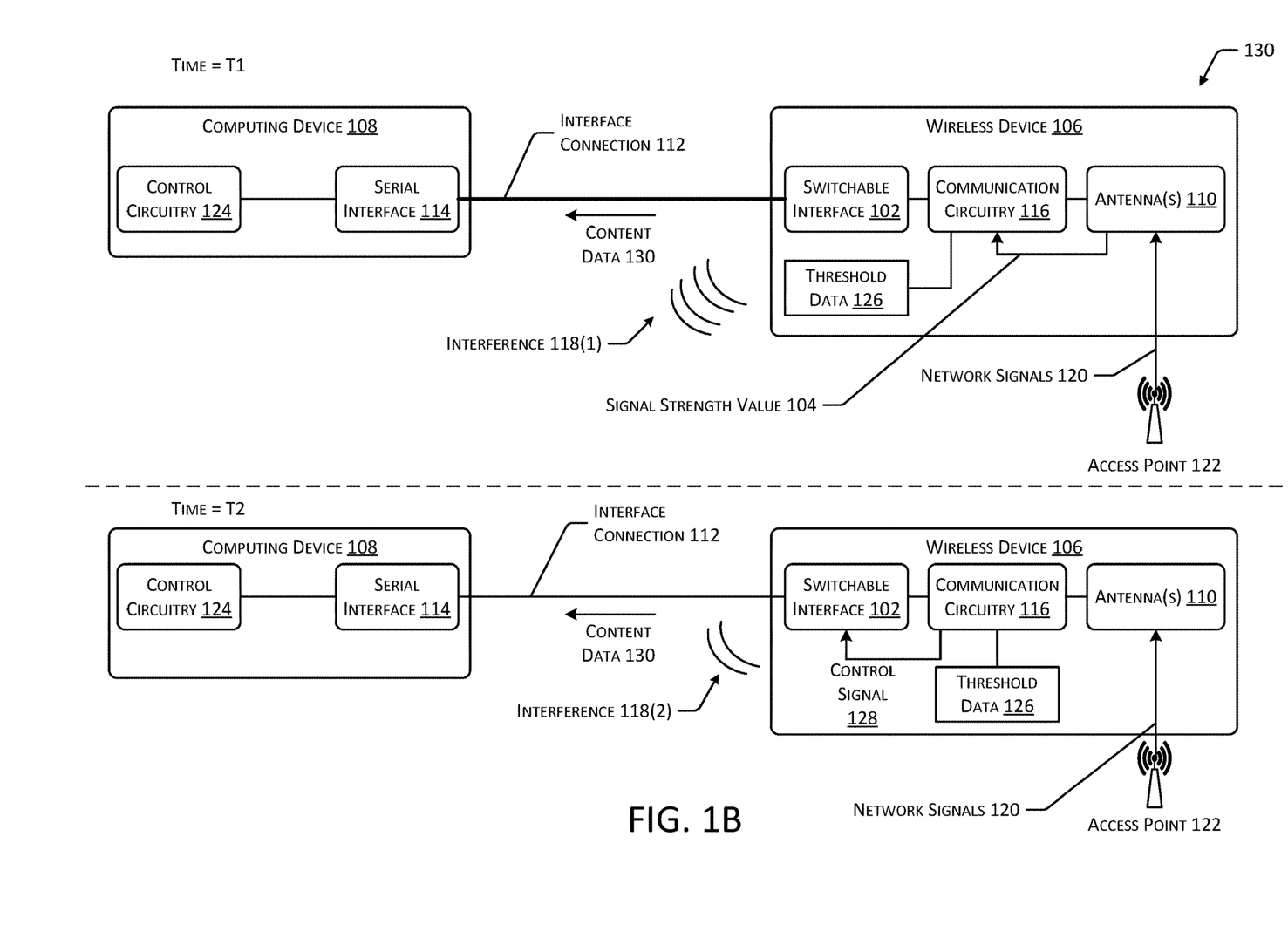
FIG. 1B is a diagram depicting an alternate implementation of a system for changing operating modes of a switchable interface associated with a wireless device based on a received signal strength value associated with wireless communication using the wireless device.

FIG. 1B is a diagram 130 depicting an alternate implementation of a system for changing operating modes of a switchable interface 102 associated with a wireless device 106 based on a received signal strength value 104 associated with wireless communication using the wireless device 106. While FIG. 1A depicts an example in which a switchable interface 102 is incorporated within a computing device 108, and a wireless device 106 is used to communicate with the computing device 108 using the interface connection 112, in other implementations, as shown in FIG. 1B, the switchable interface 102 may be included in a wireless device 106 that communicates with a serial interface 114, or other type of interface associated with the computing device.

For example, at a first time T1, when the switchable interface 102 of the wireless device 106 is operating in a first operating mode, the wireless device 106 may receive content data 130, or other types of data, such as telemetry, control data, and so forth using one or more wireless networks. Specifically, network signals 120 from a wireless access point 122 may be received by one or more antennas 110 of the wireless device 106. Communication circuitry 116 of the wireless device 106 may cause the content data 130 to be provided to the computing device 108 via the interface connection 112, which may have a high data transfer rate. For example, the first operating mode of the switchable interface 102 may include USB 3.x, and the serial interface 114 of the computing device 108 may also be capable of using USB 3.x. In such a case, data transfer rates of 4.8 GBps or more may be used. Control circuitry 124 of the computing device 108 may then receive the data via the interface connection 112 and perform one or more functions using the data. For example, the computing device 108 may include a smart television that receives audio data, video data, image data, or other types of data from the wireless device 106 for presentation using speakers, displays, and so forth.

Operation of the switchable interface 102 in the first operating mode may cause interference 118(1) that affects use of the wireless network by the wireless device 106. For example, at times when signal strength of the wireless network, as received by the wireless device 106, is low, interference 118(1) having a significant magnitude may hinder connectivity between the wireless device 106 and the wireless network, and may cause a reduced data throughput or an increased error rate associated with use of the wireless network by the wireless device 106. Conversely, operation of the switchable interface 102 in the second operating mode may be associated with a lower data transfer rate, but may also cause a smaller amount of interference 118(2) on use of the wireless network by the wireless device 106.

At the first time T1, the communication circuitry 116 of the wireless device 106 may determine a received signal strength value 104 indicative of the signal strength of the wireless network as received by the wireless device 106. Based on correspondence between the received signal strength value 104 and threshold data 126, the communication circuitry 116 may cause the switchable interface 102 to transition from the first operating mode to the second operating mode, or to continue operating in the first operating mode. For example, if the received signal strength value 104 is less than a threshold value, this may indicate that signal strength of the wireless network, as received by the wireless device 106, is sufficiently low such that the interference 118(1) caused by operation of the switchable interface 102 in the first operating mode may interfere with use of the wireless network by the wireless device 106.

In such a case, at a second time T2, the wireless device 106 may provide a control signal 128 to the switchable interface 102 to transition the switchable interface 102 from the first operating mode to the second operating mode. Operation of the switchable interface 102 in the second operating mode may enable communication using the interface connection 112 at a lower data transfer rate than the first operating mode, but may cause a smaller amount of interference 118(2) to use of the wireless network by the wireless device 106. At a subsequent time, if a received signal strength value 104 is greater than a threshold value, a control signal 128 may be sent to cause the switchable interface 102 to transition from the second operating mode to the first operating mode.

Figure 2:
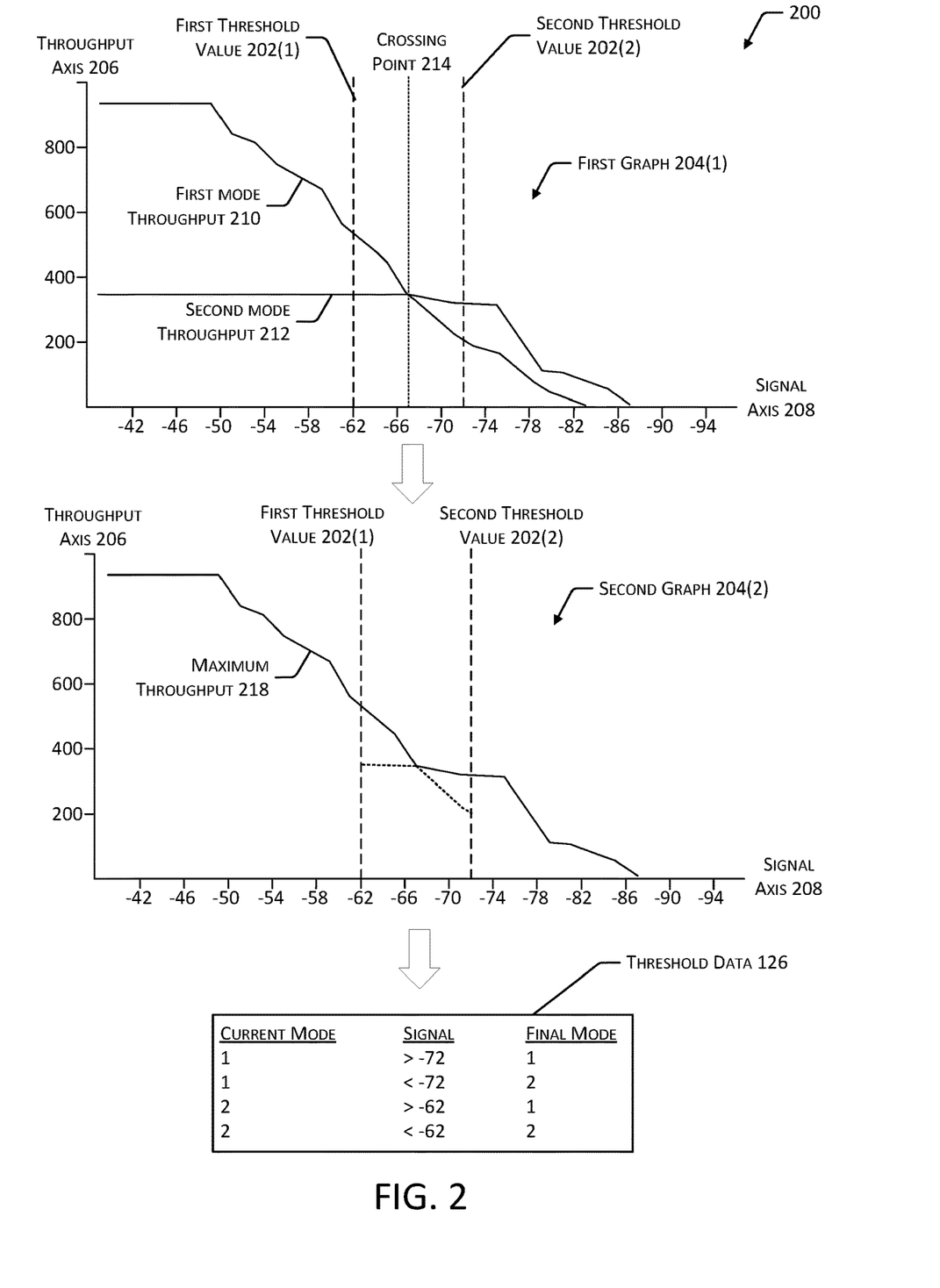
FIG. 2 is a diagram depicting an implementation of a process for determining threshold values associated with operation of a switchable interface in different operating modes.

FIG. 2 is a diagram 200 depicting an implementation of a process for determining threshold values associated with operation of a switchable interface 102 in different operating modes. As described with regard to FIGS. 1A and 1B, a switchable interface 102 may have a first operating mode associated with a first data transfer rate and a second operating mode associated with a second data transfer rate that is less than the first data transfer rate. Operation of the switchable interface 102 in the first operating mode may cause a larger amount of interference 118(1) to use of a wireless network than operation of the switchable interface 102 in the second operating mode. To reduce the effect of interference 118 on the connectivity, data throughput, and error rate associated with use of a wireless network, the switchable interface 102 may be transitioned to the second operating mode if a signal strength value 104 associated with use of the wireless network is below a threshold value 202. In some cases, multiple threshold values 202 may be used to control operation of the switchable interface 102. For example, a first threshold value 202(1) may be associated with transitioning of the switchable interface 102 to the first operating mode, while a second threshold value 202(2) may be associated with transitioning of the switchable interface 102 to the second operating mode. Use of multiple threshold values 202 may prevent unnecessary switches between operating modes when small variations in received signal strength values 104 occur.

The process of selecting the threshold values 202 is illustrated in part using a first graph 204(1) that associates data throughput values with signal strength values 104. For example, the Y-axis of the first graph 204(1) includes a throughput axis 206 that indicates amounts of data throughput (e.g., Mbps) that occur over a range of signal strength values 104 for a wireless network when the first operating mode and second operating mode of the switchable interface 102 are used. The X-axis of the first graph 204(1) includes a signal axis 208 that indicates a range of signal strength values 104, such as RSSI values (e.g., dBm).

To determine data throughput values that are associated with a range of signal strength values 104, the switchable interface 102 may operate in the first operating mode over a range of signal strength values 104. Data throughput values may be determined while the switchable interface 102 is operated in the first operating mode. The relationship between data throughput and signal strength values 104 may be represented in the first graph 204(1) as a first mode throughput 210 line. For example, when the switchable interface 102 is operated in the first operating mode, high data throughput may be possible when signal strength is high (e.g., greater than −50 dBm), but may begin to decrease as signal strength becomes weaker, approaching zero as the signal strength reaches approximately −83 dBm. The decrease in data throughput that occurs as the signal strength decreases may be caused in part by interference 118(1) associated with use of the switchable interface 102 in the first operating mode.

Data throughput values may also be determined while the switchable interface 102 is operated in the second operating mode. The relationship between data throughput and signal strength values 104 may be represented in the first graph 204(1) as a second mode throughput 212 line. For example, when the switchable interface 102 is operated in the second operating mode, a lower data throughput may be possible when the signal strength is high when compared to operation of the switchable interface 102 in the first operating mode. However, the data throughput associated with use of the second operating mode remains generally constant until low signal strength (e.g., −75 dBm) occurs, at which point the data throughput may decrease, approaching zero as the signal strength reaches approximately −87 dBm. Data throughput associated with use of the second operating mode may remain higher at times when signal strength is low, compared to data throughput when the first operating mode is used, due to lower interference 118(2) associated with use of the switchable interface 102 in the second operating mode.

As illustrated in the first graph 204(1), for a first range of signal strength values 104, ranging from −38 to −66 dB, a higher data throughput occurs when the first operating mode is used. However, when the signal strength becomes weaker than −66 dBm, a higher data throughput occurs when the second operating mode is used, due in part to the interference 118(1) associated with use of the first operating mode. A crossing point 214 in the first graph 204(1) illustrates a point (approximately −66 dBm) at which the line representing the first mode throughput 210 crosses the line representing the second mode throughput 212. Transitioning of the switchable interface 102 between modes at a signal strength value 104 corresponding to −66 dBm may be used to maximize data throughput. However, selection of threshold values 202 that are between 2 and 5 dBm greater and lesser than the value indicated by the crossing point 214 may prevent unnecessary switches between operating modes when small variations in received signal strength values occur. As such, FIG. 2 depicts a first threshold value 202(1) for transitioning from the second operating mode to the first operating mode at approximately −62 dBm, and a second threshold value 202(2) for transitioning from the first operating mode to the second operating mode at approximately −72 dBm.

As illustrated in a second graph 204(2), by transitioning between the first operating mode and the second operating mode based on signal strength values 104, the data throughput achieved using a device may approach a maximum throughput 216 line. The data represented in the first graph 204(1) and second graph 204(2) may be used to select the first threshold value 202(1) and the second threshold value 202(2), which may be used to determine threshold data 126 used to control operation of the switchable interface 102. As indicated in the threshold data 126, based on a current operating mode of the switchable interface 102 and a received signal strength value 104, the switchable interface 102 may either be retained in a current operating mode or transitioned to a different operating mode. For example, if the switchable interface 102 is currently operating in the first operating mode and the received signal strength value 104 is greater than the second threshold value 202(2) (shown as -72 in FIG.>2), the switchable interface 102 may be retained in the first operating mode. If the switchable interface 102 is operating in the first operating mode and the received signal strength value 104 is less than the second threshold value 202(2), the switchable interface 102 may be transitioned to the second operating mode. If the switchable interface 102 is currently operating in the second operating mode and the received signal strength value 104 is greater than the first threshold value 202(1) (shown as -62 in FIG. 2), the switchable interface 102 may be transitioned to the first operating mode. If the switchable interface 102 is operating in the second operating mode and the received signal strength value 104 is less than the first threshold value 202(1), the switchable interface 102 may be retained in the second operating mode.

Figure 3:
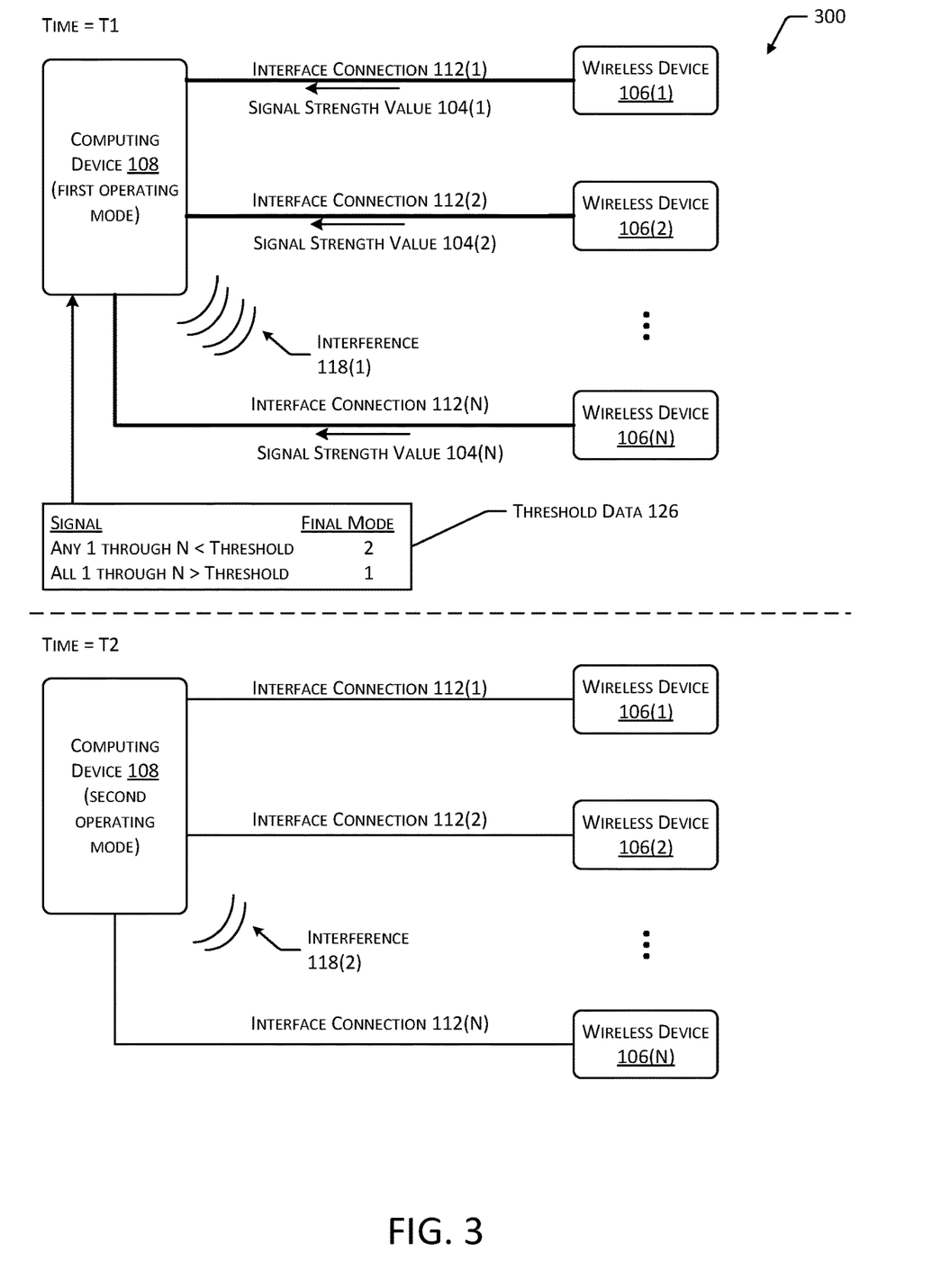
FIG. 3 is a diagram depicting an implementation of a system for changing operating modes of a switchable interface based on received signal strength values determined for multiple wireless devices.

FIG. 3 is a diagram 300 depicting an implementation of a system for changing operating modes of a switchable interface 102 based on received signal strength values 104 determined for multiple wireless devices 106. As shown in FIGS. 1A and 1B, a single wireless device 106 may connect to a switchable interface 102 of a computing device 108, or the computing device 108 may connect to a switchable interface 102 of the wireless device 106, and the operating mode of the switchable interface 102 may be determined based on a signal strength value 104 indicative of a signal strength of a wireless network as received by the wireless device 106.

In some implementations, multiple wireless devices 106 may communicate with a computing device 108. In some cases, multiple wireless devices 106 may engage the switchable interface 102 via an interface connection 112 to exchange content data 130 or other types of data, such as telemetry or control data, with the computing device 108. In other cases, multiple wireless devices 106 may communicate with the computing devices 108 using other methods, such as a wireless network. Signal strength values 104 determined from each wireless device 106 may be used to determine an operating mode for the switchable interface 102. For example, if a signal strength value 104 for any wireless device 106, a selected wireless device 106, or a selected subset of wireless devices 106, falls below a threshold value 202, the switchable interface 102 may be transitioned to the second operating mode to reduce interference 118 on use of the wireless network by the wireless device(s) 106. If the signal strength value 104 for each of the wireless devices 106, a selected wireless device 106, or a selected subset of the wireless devices 106, is greater than a threshold value 202, the switchable interface 102 may be transitioned to the first operating mode to achieve a higher data throughput rate.

In the example shown in FIG. 3, at a first time T1, the computing device 108 operating in the first operating mode may determine a first signal strength value 104(1) from a first wireless device 106(1) via a first interface connection 112(1). In other implementations, the wireless device 106(1) may provide the first signal strength value 104(1) to the computing device 108 using a wireless network or other communication method. The first signal strength value 104(1) may indicate a signal strength of a wireless network, as received by the first wireless device 106(1), such as an RSSI value. Similarly, the computing device 108 may determine a second signal strength value 104(2) from a second wireless device 106(2) via a second interface connection 112(2) or other method of communication. Any number of additional wireless devices 106(N) may communicate corresponding signal strength values 104(N) to the computing device 118 using corresponding interface connections 112(N) or other methods of communication.

The computing device 108 may determine correspondence between the determined signal strength values 104 and threshold data 126, which may be used to determine the operating mode of the switchable interface 102 of the computing device 108. In the example shown in FIG. 3, if a received signal strength value 104 for any wireless device 106 is less than a threshold value 202, the computing device 108 may be configured to transition the switchable interface 102 to the second operating mode. If each of the received signal strength values 104 is greater than a threshold value 202, the computing device 108 may be configured to operate the switchable interface 102 in the first operating mode. In other implementations, the operating mode for the switchable interface 102 may be determined based on one or more signal strength values 104 for a selected wireless device 106 or subset of wireless devices 106. In still other implementations, different threshold values 202 may be used for different wireless devices 106 or subsets of wireless devices 106.

At a second time T2, the computing device 108 may transition the switchable interface 102 to the second operating mode based on one or more of the signal strength values 104 determined from the wireless devices 106. When the switchable interface 102 operates in the second operating mode, data throughput using the interface connections 112 may be lower than when using the first operating mode, but interference 118(2) associated with use of the switchable interface 102 may be less, resulting in a lesser effect on connectivity and use of wireless networks by the wireless devices 106.

Figure 4:
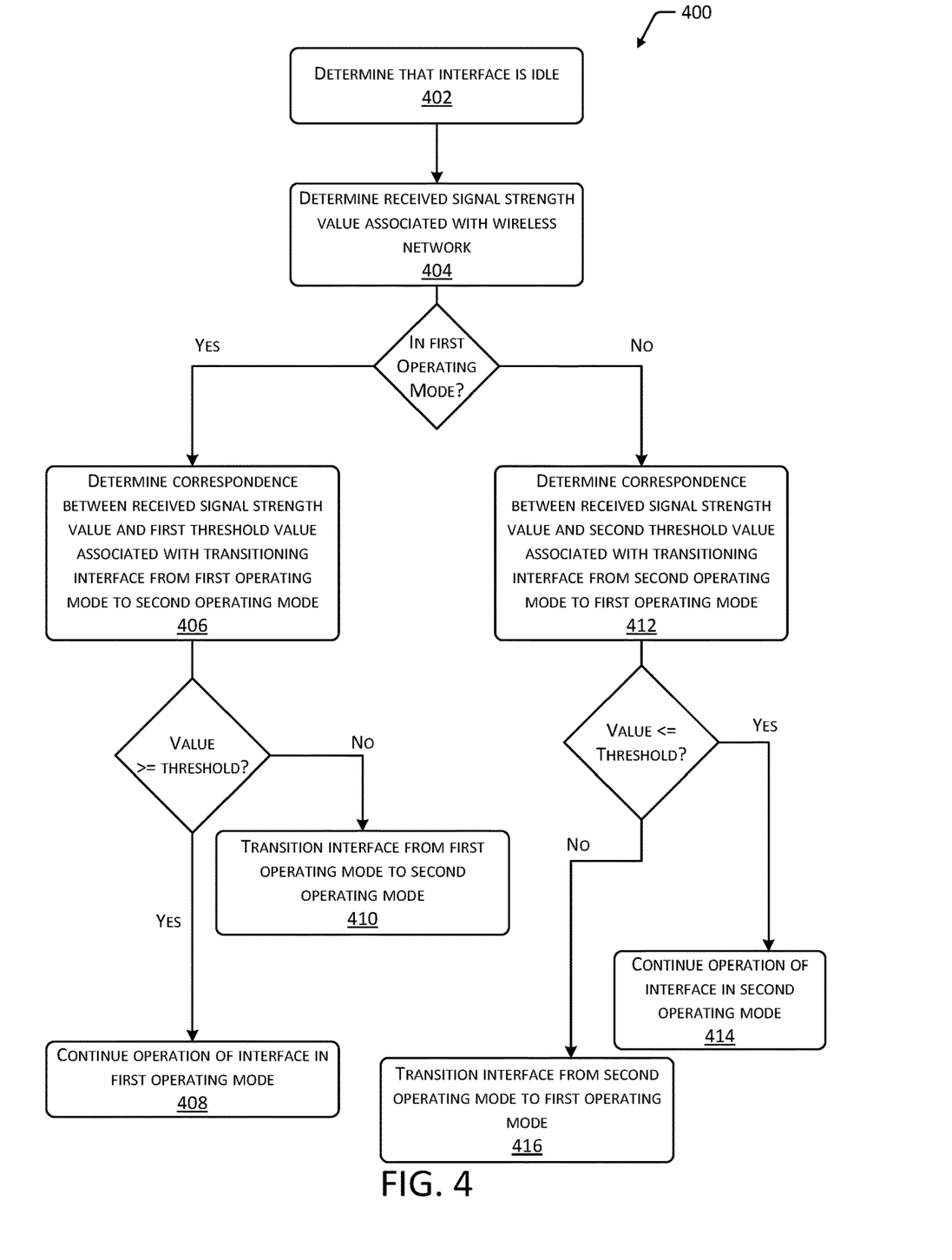
FIG. 4 is a flow diagram depicting an implementation of a method for determining an operating mode for a switchable interface based on a received signal strength value associated with use of a wireless network.

FIG. 4 is a flow diagram 400 depicting an implementation of a method for determining an operating mode for a switchable interface 102 based on a received signal strength value 104 associated with use of a wireless network. At 402, a determination may be made that the switchable interface 102 is idle. For example, transitioning of the switchable interface 102 to a different operating mode may interrupt a data transfer. Therefore, determining that the switchable interface 102 is not sending or receiving data prior to initiating a process that may result in transitioning the switchable interface 102 to a different operating mode may prevent interruption or failure of a data transfer. In other implementations, if a received signal strength value 104 deviates from a critical threshold level, such as a threshold value 202 that corresponds to failure of a data transfer having a high priority, failure to meet an SLA, and so forth, the idle or active status of the switchable interface 102 may be disregarded and the step indicated at 402 may be omitted. For example, the switchable interface 102 may be transitioned to the second operating mode to reduce interference independent of whether the switchable interface 102 is currently transmitting or receiving data if the interference 118(1) associated with use of the switchable interface 102 in the first operating mode reduces the received signal strength value 104 associated with a wireless device 106 below a critical threshold value 202.

At 404, a received signal strength value 104 associated with a wireless network may be determined. For example, a wireless device 106 that accesses a wireless network may determine an RSSI value, or another value indicative of a signal strength of the wireless network, as received by the wireless device 106. Data indicative of the received signal strength value 104 may be communicated to circuitry within the wireless device 106, or a separate computing device 108, as shown in FIGS. 1A and 1B, and such data may be used to determine an operating mode for the switchable interface 102.

If the switchable interface 102 is currently operating using the first operating mode, the method may proceed to 406. At 406, correspondence between the received signal strength value 104 and a first threshold value 202(1) may be determined. The first threshold value 202(1) may be associated with transitioning of the switchable interface 102 from the first operating mode to the second operating mode.

If the received signal strength value 104 is greater than or equal to the first threshold value 202(1), the method may proceed to 408. At 408, operation of the switchable interface 102 in the first operating mode may be continued. For example, if the received signal strength value 104 associated with use of a wireless network by a wireless device 106 is greater than the first threshold value 202(1), this may indicate that the signal strength of the wireless network, as received by the wireless device 106, is sufficiently strong such that interference 118(1) associated with use of the switchable interface 102 in the first operating mode will not significantly interfere with use of the wireless network. Continuing operation of the switchable interface 102 in the first operating mode may enable higher data transfer rates associated with the first operating mode to be maintained.

If the received signal strength value 104 is less than the first threshold value 202(1), the method may proceed to 410. At 410, the switchable interface 102 may be transitioned from the first operating mode to the second operating mode. For example, if the received signal strength value 104 associated with use of a wireless network by a wireless device 106 is less than the first threshold value 202(1), this may indicate that the signal strength of the wireless network, as received by the wireless device 106 is greater than the first threshold value 202(1), this may indicate that the signal strength of the wireless network, as received by the wireless device 106, is sufficiently low such that interference 118(1) associated with use of the switchable interface 102 in the first operating mode may affect connectivity, data transfer rates, error rates, and so forth associated with use of the wireless network. Transitioning of the switchable interface 102 to the second operating mode may enable the interference 118(2) caused by use of the switchable interface 102 to be reduced.

In some implementations, if a priority value associated with a transfer of data using the switchable interface 102 is determined, operation of the switchable interface 102 in the first operating mode may be continued. For example, if decreasing the data transfer rate associated with the switchable interface 102 will cause a degradation in performance of a priority operation, the switchable interface 102 may continue operation in the first operating mode to prioritize the operation even in cases where interference 118(1) associated with the switchable interface 102 may cause loss of connectivity or a degradation in performance when using a wireless network.

When the switchable interface 102 is currently using the second operating mode, the method may instead proceed from 404 to 412. At 412, correspondence between the received signal strength value 104 and a second threshold value 202(2) may be determined. The second threshold value 202(2) may be associated with transitioning the switchable interface 102 from the second operating mode to the first operating mode. In some implementations, the first threshold value 202(1) and second threshold value 202(2) may be the same value. In other cases, as described with regard to FIG. 2, the first threshold value 202(1) and second threshold value 202(2) may be spaced from one another to prevent unnecessary switches between operating modes when small variations in received signal strength values 104 occur.

If the received signal strength value 104 is less than or equal to the second threshold value 202(2), the method may proceed to 414. At 414, operation of the switchable interface 102 in the second operating mode may be continued. For example, if the received signal strength value 104 is less than the second threshold value 202(2), this may indicate that signal strength of the wireless network, as received by the wireless device 106, is sufficiently low such that transitioning of the switchable interface 102 to the first operating mode may interfere with connectivity, data transfer rates, error rates, or other characteristics of use of the wireless network. Continued operation of the switchable interface 102 in the second operating mode may cause interference 118(2) associated with the switchable interface 102 to be less likely to interfere with use of the wireless network.

If the received signal strength value 104 is greater than the second threshold value 202(2), the method may proceed to 416. At 416, the switchable interface 102 may be transitioned from the second operating mode to the first operating mode. For example, if the received signal strength value 104 is greater than the second threshold value 202(2), this may indicate that the signal strength of the wireless network, as received by the wireless device 106, is sufficiently strong such that interference 118(1) caused by use of the switchable interface 102 in the first operating mode is unlikely to hinder use of the wireless network. In such a case, transitioning the switchable interface 102 to the first operating mode may enable a higher data transfer rate to be used.

Figure 5:
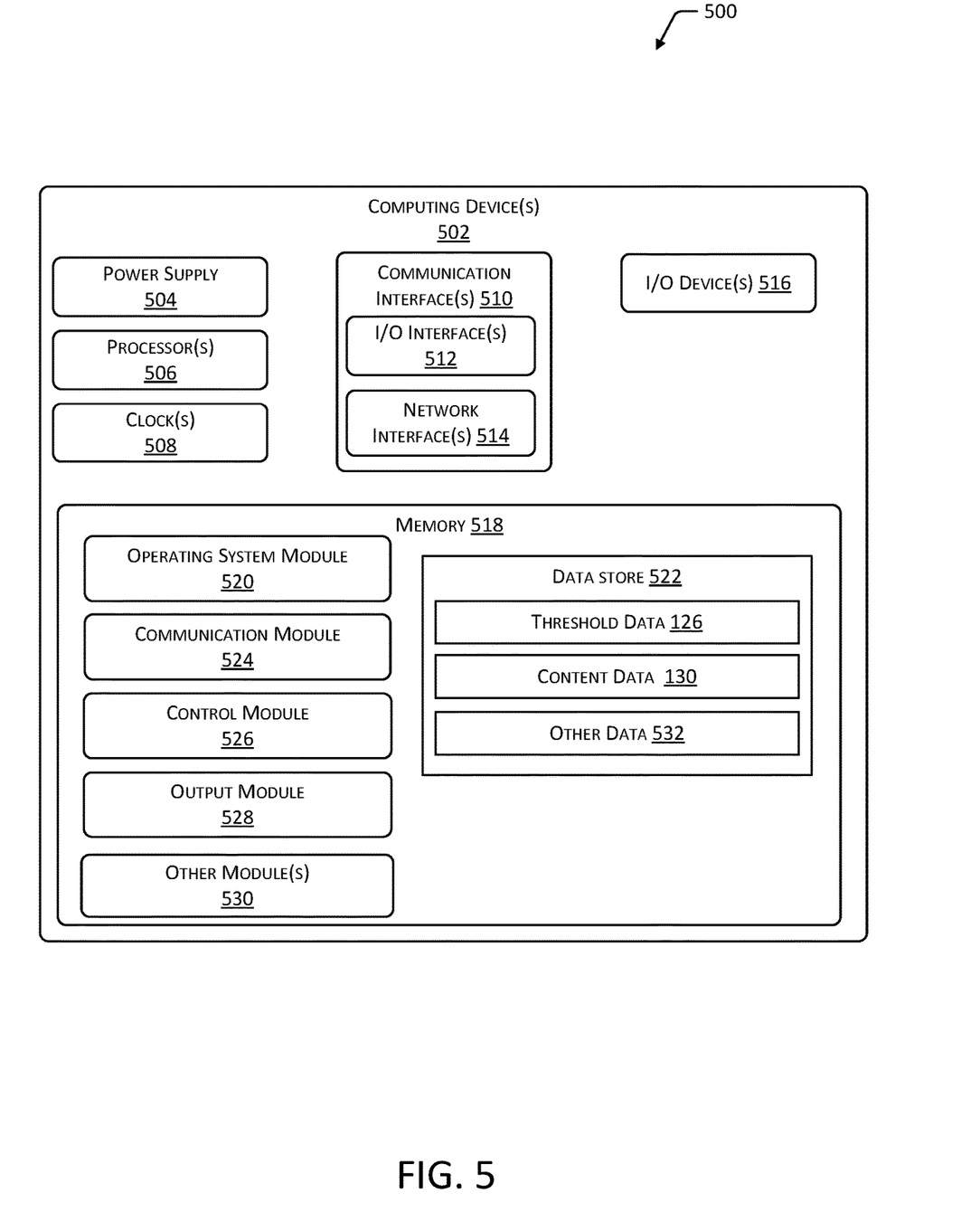
FIG. 5 is a block diagram depicting an implementation of a computing device within the present disclosure.

FIG. 5 is a block diagram 500 depicting an implementation of a computing device 502 within the present disclosure. The computing device 502 may include any type of device that includes a switchable interface 102, as described with regard to FIGS. 1-4. For example, the computing device 502 shown in FIG. 5 may include one or more computing devices 108 such as the computing devices 108 shown in FIGS. 1A, 1B, and 3. The computing device 502 shown in FIG. 5 may also include one or more wireless devices 106, such as the wireless devices 106 shown in FIGS. 1A, 1B, and 3. The computing device 502 shown in FIG. 5 may also include one or more other computing devices 502, such as servers or other types of computing devices in wireless or direct communication with one or more devices that include a switchable interface 102. Additionally, while FIG. 5 depicts a single block diagram 500, the depicted computing device 502 may include any number of computing devices of similar or different types.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth. In other implementations, circuitry such as the control circuitry 124 or communication circuitry 116 described with regard to FIGS. 1A and 1B may be used in addition to or in place of one or more processors 506 to control operations of the computing device 502.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points 122, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, 6G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices, network attached storage devices, and so forth.

A communication module 524 may be configured to establish communications with one or more other computing devices 502. Communications may be authenticated, encrypted, and so forth.

The memory 518 may also store a control module 526. The control module 526 may receive signal strength values 104 from one or more other components of the computing device 502, or from other computing devices, and may determine correspondence between the received signal strength values 104 and threshold data 126. Based on the correspondence, the control module 526 may cause a switchable interface 102 associated with the computing device 502, or with another device, to operate in a selected operating mode. For example, if a received signal strength value 104 is less than a threshold value 202, the switchable interface 102 may be operated in an operating mode having a lower data throughput value but that also causes a lower amount of interference 118(2) to wireless communication. If the received signal strength value 104 is greater than a threshold value 202, the switchable interface 102 may be operated in an operating mode having a higher data throughput value that may be associated with a larger amount of interference 118(1).

The memory 518 may additionally store an output module 528. The output module 528 may receive content data 130, which may include video data, audio data, image data, alphanumeric data, haptic data, or other types of data, and may generate output based on the content data 130 to be presented using one or more output devices. For example, content data 130 may include audio data or video data received via an interface connection 112 or via one or more wireless networks, which may be presented using one or more display devices or speakers associated with the computing device 502. The rate at which the content data 530 is received may depend in part on the operating mode of the switchable interface 102. For example, content data 530 received via an interface connection 112 may be received using a faster data transfer rate if the switchable interface 102 is operated in a first operating mode, and at a slower rate if the switchable interface 102 is operated in a second operating mode. However, content data 530 received via a wireless network may be received at a slower rate if the switchable interface 102 is operated in the first operating mode due to interference 118(1) caused by the switchable interface 102, but may receive content data 530 at a faster rate if the switchable interface 102 is operated in the second operating mode due to a lower amount of interference 118(2) associated with the second operating mode.

Other modules 530 may also be present in the memory 518. For example, other modules 530 may include permission or authorization modules for sending data to or receiving data from the computing device 502, for modifying configurations, settings, or threshold data 126 associated with the computing device 502, and so forth. Other modules 530 may also include encryption modules to encrypt and decrypt communications between computing devices 502, authentication modules to authenticate communications sent or received by computing devices 502, user interface modules to generate interfaces for presenting output, receiving input from users, and so forth.

Other data 532 within the data store(s) 522 may include configurations, settings, preferences, and default values associated with computing devices 502. Other data 532 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a wireless interface;
   a serial interface comprising circuitry to operate in one of a first operating mode or a second operating mode, wherein the first operating mode is associated with a first data transfer rate, and the second operating mode is associated with a second data transfer rate that is less than the first data transfer rate;
   control circuitry to transition the serial interface between the first operating mode and the second operating mode;
   one or more non-transitory memories storing computer-executable instructions; and
   one or more hardware processors to execute the computer-executable instructions to:
      at a first time, determine a first received signal strength value associated with the wireless interface;
      determine a first threshold value associated with use of the serial interface in the first operating mode;
      determine a second threshold value associated with use of the serial interface in the second operating mode;
      determine that the first received signal strength value is less than the first threshold value;
      in response to the first received signal strength value being less than the first threshold value, operate the serial interface in the second operating mode;
      at a second time after the first time, determine a second received signal strength value associated with the wireless interface;
      determine that the second received signal strength value is greater than the second threshold value; and
      in response to the second received signal strength value being greater than the second threshold value, transition the serial interface from the second operating mode to the first operating mode.

2. The system of claim 1, further comprising computer-executable instructions to:
   determine that the serial interface is idle before transitioning the serial interface from the first operating mode to the second operating mode.

3. A system comprising:
   a serial interface;
   a wireless device connected to the serial interface, wherein the wireless device communicates using a wireless network;
   one or more non-transitory memories storing computer-executable instructions; and
   one or more hardware processors to execute the computer-executable instructions to:
      determine a first received signal strength value associated with the wireless network;
      determine that the first received signal strength value is less than a first threshold value;
      in response to the first received signal strength value being less than the first threshold value, transition the serial interface from a first operating mode to a second operating mode;
      determine a second received signal strength value associated with the wireless network;
      determine that the second received signal strength value is greater than one or more of the first threshold value or a second threshold value; and
      in response to the second received signal strength value being greater than the one or more of the first threshold value or the second threshold value, transition the serial interface from the second operating mode to the first operating mode.

4. The system of claim 3, wherein:
   the first operating mode of the serial interface is associated with a first data transfer rate; and
   the second operating mode of the serial interface is associated with a second data transfer rate that is less than the first data transfer rate.

5. The system of claim 3, further comprising computer-executable instructions to:
   determine one or more first data throughput values associated with a first signal-to-noise ratio, wherein the first signal-to-noise is greater than a third threshold value, and wherein the one or more first data throughput values are associated with communication by the wireless device during use of the serial interface in the first operating mode;
   determine one or more second data throughput values associated with a second signal-to-noise ratio, wherein the second signal-to-noise ratio is greater than the third threshold value, and wherein the one or more second data throughput values are associated with communication by the wireless device using the wireless network during use of the serial interface in the second operating mode; and
   based on the one or more first data throughput values and the one or more second data throughput values, determine the first threshold value.

6. The system of claim 3, further comprising computer-executable instructions to:
   determine one or more first data throughput values associated with a range of signal values, wherein the one or more first data throughput values are associated with the wireless device during use of the serial interface in the first operating mode;
   determine one or more second data throughput values associated with the range of signal values, wherein the one or more second data throughput values are associated with the wireless device during use of the serial interface in the second operating mode;
   determine a signal value associated with a second data throughput value of the one or more second data throughput values that is greater than or equal to a first data throughput value of the one or more first data throughput values; and
   determine the first threshold value based on the signal value.

7. The system of claim 3, further comprising computer-executable instructions to:
   determine that the serial interface is not transmitting or receiving data, wherein the serial interface is transitioned from the first operating mode to the second operating mode further in response to the serial interface not transmitting or receiving data.

8. The system of claim 3, further comprising computer-executable instructions to:
   determine that the serial interface is transmitting or receiving data;
   determine that the first received signal strength value is less than a third threshold value, wherein the third threshold value is less than the first threshold value; and
   in response to the first received signal strength value being less than the third threshold value, cease transmission or receipt of data using the serial interface, wherein the serial interface is transitioned from the first operating mode to the second operating mode further in response to the first received signal strength value being less than the third threshold value.

9. The system of claim 3, further comprising:
   a computing device in wireless communication with the wireless network, wherein the first received signal strength value is associated with communication by the computing device using the wireless network.

10. The system of claim 9, further comprising computer-executable instructions to:
    determine a second signal strength value associated with communication by the wireless device using the wireless network; and
    determine that the second signal strength value is greater than the first threshold value.

11. A system comprising:
    an interface having a first operating mode and a second operating mode, wherein a first data transfer rate associated with the first operating mode is greater than a second data transfer rate associated with the second operating mode;
    a wireless device that communicates using a wireless network;
    one or more non-transitory memories storing computer-executable instructions; and
    one or more hardware processors to execute the computer-executable instructions to:
       determine that a first received signal strength value associated with the wireless network is greater than a first threshold value; and
       in response to the first received signal strength value being greater than the first threshold value, transition the interface from the second operating mode to the first operating mode.

12. The system of claim 11, wherein:
    the first operating mode is associated with a first amount of interference to communication using the wireless network; and
    the second operating mode is associated with a second amount of interference to communication using the wireless network that is less than the first amount of interference.

13. The system of claim 11, further comprising computer-executable instructions to:
    determine one or more first data throughput values associated with one or more wireless networks during use of the interface in the first operating mode;
    determine one or more second data throughput values associated with the one or more wireless networks during use of the interface in the second operating mode; and
    based on the one or more first data throughput values and the one or more second data throughput values, determine the first threshold value.

14. The system of claim 11, further comprising computer-executable instructions to:
    determine one or more first data throughput values associated with a range of signal values associated with the wireless device during use of the interface in the first operating mode;
    determine one or more second data throughput values associated with the range of signal values during use of the interface in the second operating mode;
    determine a signal value associated with a second data throughput value of the one or more second data throughput values that is greater than or equal to a first data throughput value of the one or more first data throughput values;
    determine, based on the signal value, the first threshold value, wherein the first threshold value is associated with operation of the interface in the second operating mode; and
    determine, based on the signal value, a second threshold value associated with operation of the interface in the first operating mode.

15. The system of claim 11, further comprising computer-executable instructions to:
    determine that the interface is not transmitting or receiving data, wherein the first received signal strength value is determined in response to determining that the interface is not transmitting or receiving data.

16. The system of claim 11, further comprising:
    a computing device in communication with the interface; and computer-executable instructions to:
    determine that the computing device is transmitting or receiving data using the interface;
    determine that a priority associated with the computing device is greater than a priority associated with the wireless network; and
    determine that the computing device has ceased transmitting or receiving data using the interface, wherein the interface is transitioned from the second operating mode to the first operating mode in response to determining that the computing device has ceased transmitting or receiving data using the interface.

17. The system of claim 11, wherein the interface comprises a Universal Serial Bus (USB) interface and the wireless network comprises a Wi-Fi network.

18. A system comprising:
    an interface having a first operating mode and a second operating mode;
    a wireless device that communicates using a wireless network;
    one or more non-transitory memories storing computer-executable instructions; and
    one or more hardware processors to execute the computer-executable instructions to:
       determine one or more first data throughput values associated with one or more wireless networks during use of the interface in the first operating mode;
       determine one or more second data throughput values associated with the one or more wireless networks during use of the interface in the second operating mode; and
       based on the one or more first data throughput values and the one or more second data throughput values, determine one or more threshold values;
       determine a first received signal strength value associated with the wireless network;

determine correspondence between the first received signal strength value and the one or more threshold values; and based on the correspondence, one or more of:
   transition the interface from the first operating mode to the second operating mode; or
   transition the interface from the second operating mode to the first operating mode.

19. The system of claim 18, wherein the one or more first data throughput values and the one or more second data throughput values are associated with a range of signal values associated with the wireless device during use of the interface, the system further comprising computer-executable instructions to:
   determine a signal value associated with a second data throughput value of the one or more second data throughput values that is greater than or equal to a first data throughput value of the one or more first data throughput values;
   determine, based on the signal value, a first threshold value of the one or more threshold values, wherein the first threshold value is associated with operation of the interface in the second operating mode; and
   determine, based on the signal value, a second threshold value of the one or more threshold values, wherein the second threshold value is associated with operation of the interface in the first operating mode.

20. A system comprising:
an interface having a first operating mode and a second operating mode;
a wireless device that communicates using a wireless network;
one or more non-transitory memories storing computer-executable instructions; and
one or more hardware processors to execute the computer-executable instructions to:
   determine a first received signal strength value associated with the wireless network;
   determine that the first received signal strength value is less than a first threshold value;
   determine that the interface is transmitting or receiving data;
   determine that the first received signal strength value is less than a second threshold value, wherein the second threshold value is less than the first threshold value; and
   in response to the first received signal strength value being less than the second threshold value, cease transmission or receipt of data using the interface and transition the interface from the first operating mode to the second operating mode.

* * * * *

UNITED STATES PATENT AND TRADEMARK OFFICE
CERTIFICATE OF CORRECTION

| | | |
|---|---|---|
| PATENT NO. | : 12,007,925 B1 | Page 1 of 1 |
| APPLICATION NO. | : 17/935375 | |
| DATED | : June 11, 2024 | |
| INVENTOR(S) | : Yan Xie et al. | |

It is certified that error appears in the above-identified patent and that said Letters Patent is hereby corrected as shown below:

In the Claims

Column 18, Claim 5, Line 26:
Currently reads "signal-to-noise is greater than"
Where it should read --signal-to-noise ratio is greater than--

Signed and Sealed this
Sixth Day of August, 2024

Katherine Kelly Vidal
*Director of the United States Patent and Trademark Office*